Oct. 19, 1937.  2,096,396
G. R. G. GATES, FORMERLY G. R. GREENBERGH
SERVO BRAKE MECHANISM
Filed June 3, 1935   2 Sheets-Sheet 2
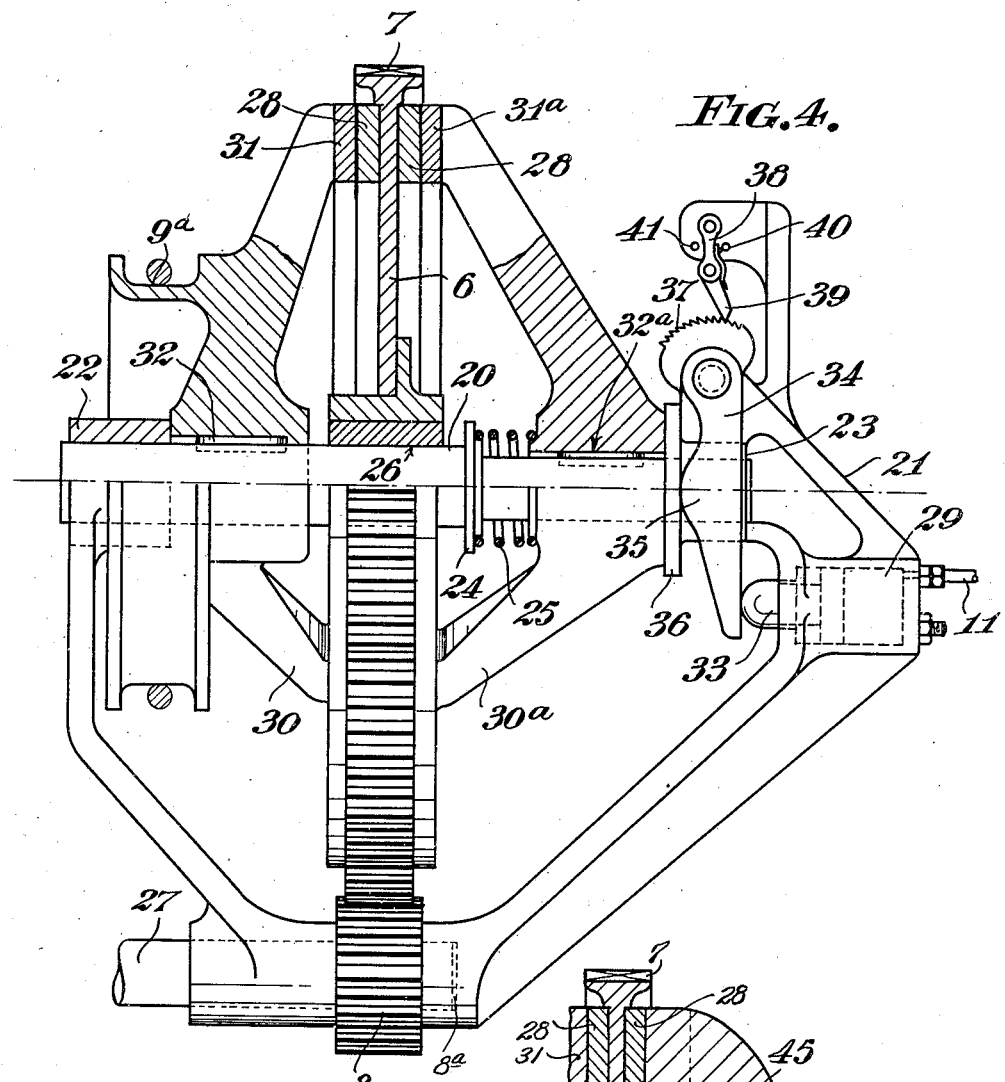
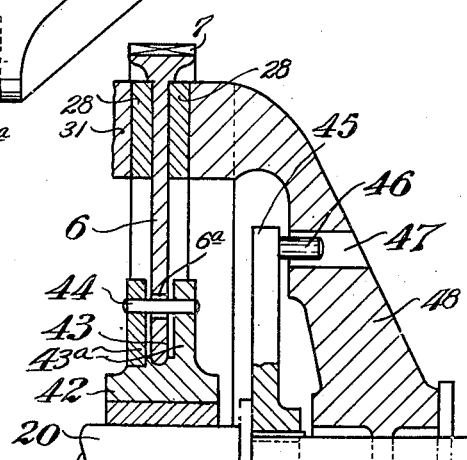

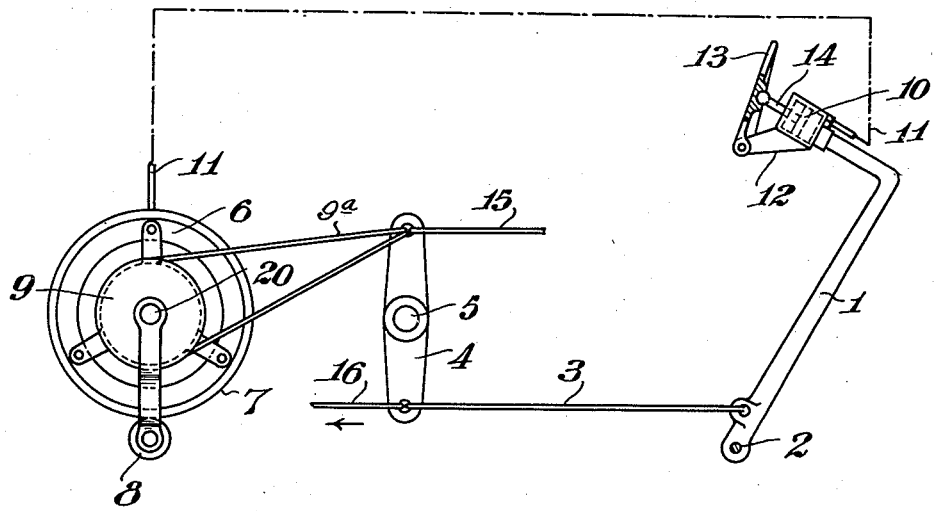
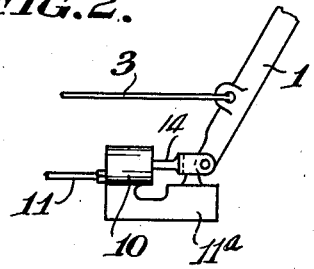
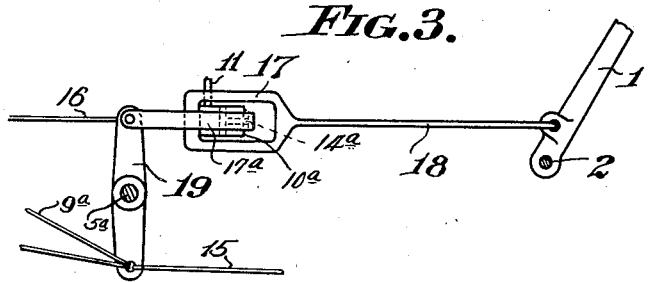

Patented Oct. 19, 1937

2,096,396

UNITED STATES PATENT OFFICE 2,096,396

SERVO BRAKE MECHANISM

Geoffrey Robert Greenbergh Gates, formerly Geoffrey Robert Greenbergh, London, England Application June 3, 1935, Serial No. 24,726
In Great Britain June 7, 1934

14 Claims. (Cl. 188—140)

This invention has reference to servo brake mechanism of the type commonly known as the clutch type, that is to say that type in which drive and driven members are incorporated the drive deriving power from the engine or vehicle movement the said members frictionally engaging when the brake pedal is operated, this engagement imparting a torque movement to the driven members causing the application of the brakes.

The object of my invention is to provide a brake gear particularly for automobiles, of powerful operation. A further object is to provide a brake gear which is operated efficiently by a small control movement, and especially one in which the braking effort is substantially proportional to the brake pedal movement resulting in a braking action which is completely progressive.

Other objects and advantages of the invention will be understood from the following description of preferred methods of operation and construction which have reference to the accompanying sheets of drawings in which:—

Fig. 1 is a diagrammatic view of a preferred arrangement showing the operation of the invention.

Figs. 2 and 3 are similar views of the essential parts of further modifications.

Fig. 4 is an elevation partly in section of the servo mechanism and

Fig. 5 is a fragmentary view of modifications to the mechanism shown in Fig. 4.

In the drawings the servo motor is hydraulically operated in such a manner to provide a fully progressive action. Referring firstly to Fig. 1 the brake pedal is pivoted to the chassis or other support 2 and is connected by a draw rod 3 to one end of an arm 4 mounted on a cross-shaft 5 of the brake rigging. The servo motor which is hereinafter described in detail comprises a rotating plate 6 having a toothed edge 7 which is driven by the cog wheel 8, said cog wheel deriving its power from the engine or vehicle movement. Two driven plates are provided one, 9, which is shown in Fig. 1, said plate being coupled by cable 9a to the other end of the arm 4. This plate 9 is rigidly mounted on the shaft 20 whilst the other plate not shown is adapted to turn therewith but is capable of sliding along said shaft as later described in connection with Fig. 4. The two driven plates and the rotating plate 6 are arranged so as to frictionally engage on application of the brakes and so turn the cross shaft 20 in an anti-clockwise or clockwise direction depending on whether the car is running forward or in reverse.

At the upper end of the brake pedal a hydraulic cylinder 10 is mounted, said cylinder being connected by pipe line 11 to a hydraulic cylinder (not shown in Fig. 1) on the servo motor. An extension 12 is provided from the pedal, said extension having pivoted thereto the foot pad 13, on the underside of which engages the ram head 14 of the cylinder. The rod 15 connects the arm 4 to the front brakes, whilst the rod 16 connects same to the rear brakes.

In operation, when the foot pad 13 is depressed, the ram head 14 is forced into the cylinder 10 and the servo motor is actuated by virtue of its hydraulic cylinder urging the sliding plate towards the plate 9, causing the arm 4 to move in an anticlockwise direction to apply the brakes. The pedal 1 will also move downwardly owing to the movement of said arm, this movement tending to reduce the fluid pressure, and it will be appreciated that a state of balance is set up. Further depression of the pad will apply the brakes harder, but it will not be possible for any binding or locking due to the power derived from the servo motor to take place. If, for any reason (such as a break in the pipe 11), the hydraulic mechanism fails, then the ram will be forced to the bottom of its cylinder, and the brakes are operated by the draw rod 3.

Referring to Fig. 2 the hydraulic cylinder 10 is mounted by means of a shoe 11a on the chassis, and no fixed pivot is provided for the pedal only that formed by the draw rod 3 and the pivot for the ram 14. In this case depression of the pedal (which will of course be suitably guided), forces the ram 14 into the cylinder 10 to apply the brakes, and the application of the brakes tends to urge—through the rod 3—the pedal downwardly and away from the driver's foot, so drawing the ram 14 out of the cylinder 11 and reducing the hydraulic pressure. The cylinder will become a fixed pivot should the hydraulic arrangement fail, and the brakes will be operated by the draw rod 3.

A third and preferred arrangement is illustrated in Figure 3. In this case, the pedal is pivoted to the chassis at 2, and there is a mechanical coupling between the brake rigging and the pedal which includes the hydraulic cylinder and ram by which the brake rigging is actuated to apply the brakes. To this end the hydraulic cylinder and ram device 10a, 14a is mounted within a yoke 17, 17a, the member 17 being connected, by draw bar 18, to the pedal 1, and the member 17a being connected to a pivoted arm 19 which is incorporated in the brake rigging so as to be turned as the brakes are applied (due to operation of the servo motor) and cause separation of the cylinder and ram. In the embodiment diagrammatically shown in the drawings, the arm 19 turns clockwise when the brakes are applied, and for convenience of illustration it is shown directly actuating the front and rear brake rods 15 and 16. The rear brake rod 16 is connected to the top end of the arm 19 whilst the front brake rod 15 is attached to the bottom end of the arm with the pivot 5a disposed intermediately, the cable 9a from the servo motor being attached to the bottom end of the arm. The cylinder 10a is secured to one member of the yoke (in the drawings the member 17) and the piston to the other yoke member (17a). Upon the pedal being depressed the cylinder and ram will be compressed together, thus applying fluid pressure through pipe 11 to operate the servo motor. The resulting movement of the arm 19 to apply the brakes causes also the cylinder and ram to separate. Fluid pressure to the servo motor is thus reduced and at the same time the tension will be reduced in the rod 18 and accordingly the pressure reduced between the pedal and operator's foot.

It will be obvious that yoke member 17a which is shown connected to the arm 19 could be connected to the arm 4 at the point where the rod 3 is attached in Fig. 1, with the same result. Should the hydraulic device fail the latter will become solid with the bar 18 and yoke 17, 17a and constitute a direct mechanical connection for actuating the brake rigging for applying the brakes.

Also, means may be provided to take up wear occurring between the friction faces of the servo, so that only sufficient clearance need be provided to ensure separation and prevent dragging of the brakes. This ensures that the servo needs little attention and also that the foot pedal movement to take up clearance between the friction faces will be substantially constant.

The means for taking up wear are particularly intended for use with a hydraulic system operating an open circuit since as the wear is taken up the hydraulic fluid in the system will be supplemented from a reservoir.

Figure 4 illustrates a preferred arrangement of servo motor constructed in accordance with this present invention and illustrated generally in Fig. 1. In Fig. 4, is a U-shape supporting frame or bracket 21 having co-axial bearings 22, 23 preferably oil-less for the reception therein of the ends of the shaft 20. Mounted on the shaft adjacent the bearing 22, is one faced member said member comprising a central boss and radial arms 30, said arms carrying the annular faced member 31. Suitable keys and keyways such as 32 are provided to lock the boss on the shaft 20. Extending rearwardly from the faced member is a drum 9, said drum serving as a means for carrying the cable 9a which is coupled to the brake rigging.

A complementary faced member is provided comprising a central boss, radial arms 30a, carrying an annular face 31a, said boss is also secured to the shaft 20 by means 32a, but is capable of moving along the shaft. The portion of the shaft on which is mounted the complementary member is of slightly smaller diameter than the remainder, and a flanged abutment 24 is mounted on the narrow portion against the shoulder formed by the wider portion, said abutment receiving one end of a very light coiled spring 25 the other end of which butts against the complementary boss.

Between the face plate is a disc like member or plate 6 said member mounted on a bearing 26, which is conveniently of the oil-less type. Said plate has rotary motion imparted thereto by the vehicle movement or engine and to this end its edge 7 is toothed, and carried by a bearing 8a in the frame 21 is a toothed wheel 8 meshing with the toothed edge 7. The wheel 8 is driven by a flexible shaft 27, said shaft being driven from the gear box, and if desired forming part or being an extension of the usual speedometer drive. On either side of the plate 6 friction faces 28 are provided to co-operate with the facings of the aforesaid faced members which are conveniently of cast iron.

It will be understood that the central plate may be driven as herein described and illustrated or the shaft 20 may be driven and with it the pair of plates the central plate being connected to the rigging. Also it must be understood that the term plate includes any suitable member having a boss or the like shaft mounting, supporting a circular or conical face or faces.

Mounted on the frame 21 is a hydraulic cylinder 29 the ram head 33 of which projects therefrom to abut a bifurcated lever 34, pivoted to the frame 21. The said lever has a hump like portion 35 at each side, which abuts a flange 36 on the boss of the member 30a. The hydraulic cylinder is operated by the manual operation of the brake pedal, through the hydraulic gear such as hereinbefore described connected by pipe line 11 to the cylinder 29.

In operation, the plate 6 is driven by the engine and whilst the brake is in the normally inoperative position, the spring 25 maintains the complementary faced member 30a away from the rotating plate, which assumes a position on the shaft 20 just clear of the other faced member. When pressure is applied to the brake pedal the fluid pressure set up in the pipe line will force the ram head 33 hard against the lever 34, and its cam or hump portions will urge the complementary faced member 30a towards the plate, until the entire unit comprising the two faced members 30, 30a and shaft 20 commence turning, owing to the torque set up by the frictional engagement. It will be understood that the harder the brake is applied, the greater will be the turning moment of the drum 9, and consequently the greater the braking effort, although owing to the balance effect set up in the operating mechanism a progressive action is obtained free from snatching or binding.

It will be observed from the foregoing example that the servo motor is of simple construction the whole moving parts being mounted on a shaft journalled in two plain bearings.

Means may be provided to take up wear between the friction faces so that the clearance will be constant within narrow limits. An example of one arrangement is illustrated in the drawings and comprises an arcuate ratchet or serrated member 37 which pivots with the bifurcated lever 34. Suitably pivoted on a link 38 is a spring controlled pawl 39, the link itself being pivoted on a suitable part or extension of the frame 21. The movement of the link is positively limited in both directions by stops 40, 41.

On the operation of the servo, the lever 34 and with it the arcuate ratchet, pivots in a clockwise direction moving the complementary member towards the central plate. When a sufficient degree of wear occurs, the forward movement of the pawl is stopped as the link 38 co-operates with the stop 40 before the facings engage. This causes the pawl to ride up the ratchet tooth of the rack 37 with which it happens to be engaged and eventually engage behind the next tooth and restore the normal clearance in the idle position as when the hydraulic pressure ceases the arcuate ratchet will move in an anticlockwise direction the movement being determined by the stop 41. The spring 25 may be dispensed with since the moving parts are of a light nature and the friction surfaces will separate readily.

This arrangement is particularly applicable if the hydraulic system is of the open circuit type. The ram head 33 may be coupled to the end of the lever 34 and when wear is taken up the hydraulic system will be automatically replenished from a suitable reservoir.

It will also be observed that accurate initial adjustment is unnecessary as if the face of the complementary member is pressed hard against the co-operating face of the central plate, the pawl will assume its correct position in the serrated member, the clearance depending upon the size of the serrations and the clearance between stops 40, 41.

A fragmentary view of an alternative arrangement is illustrated in Fig. 5. In this the plate 6 and member 30a are mounted so as to have a certain degree of flexibility or to "float."

In the figure the centre plate 6 is of annular form, and fits within a groove in the boss 42, which has a circumferential groove 43 with a curved bed. The said plate is prevented from angular movement by pins one of which 44 is shown, the pins passing through the sides or flanges 43a of the groove, and the plate having corresponding holes 6a in which the pins are loose fits to give a slight degree of angular and backward and forward play. The flanges 43a forming the groove are slightly spaced apart from the plate to give the backward and forward movement.

The member 48 corresponding to the member 30a in Fig. 4 is also given a degree of flexibility by mounting same on a spider 45 rigidly, keyed to the shaft and having pins 46 engaging in holes 47. The member 48 will rotate with the shaft 20 but will have a degree of free or floating movement. This arrangement also allows for the necessary axial movement of the member 48 for operating the servo and for following up wear on the friction linings.

It will be understood that the brake rigging which includes the pivoted arm 4 or 19, may be arranged to actuate the brake shoes by any suitable connection, e. g. hydraulic or other than mechanical, and accordingly the synonymous terms "brake gear" and "brake rigging" as used herein should be read broadly.

I claim:—

1. A servo brake mechanism comprising two driven plates or members, each comprising a central boss keyed to a shaft and a plurality of radial arms carrying a facing ring, a central plate loosely mounted on the shaft having friction rings at each side and a toothed periphery, a driving cog meshing with the toothed periphery, a substantially U shaped bracket having co-axial bearings for supporting the shaft and a bearing for supporting the driving cog, one of the pair of plates having a sliding movement along said shaft, a pivoted finger having a portion butting against the rear of the sliding portion, an operated hydraulic cylinder mounted on the bracket and having a ram to butt against the finger, a brake pedal, an operating hydraulic cylinder actuated by brake pedal movement to force the ram against the finger and slide the one plate towards the central plate, brake rigging, and means connecting the other plate of the pair on to the brake rigging.

2. A servo brake mechanism of the type set forth comprising a substantially U shaped supporting frame, co-axial bearings in each limb, a shaft mounted in said bearings, said shaft having a portion at one end of narrow diameter, a faced member rigidly mounted and a rotating plate loosely mounted on the wider portion of said shaft, a second driven member mounted on the narrow portion of the shaft to turn therewith but capable of sliding therealong, a spring between the sliding member and the end of the wider portion of the shaft, an operated hydraulic cylinder in the limb adjacent the sliding member, a pivoted operating trigger having a portion adapted to contact with the end of a boss of the sliding member, said trigger co-operating with the ram head of the operated hydraulic cylinder, the operation of which causes the sliding member to approach the rotating plate, a toothed periphery to the rotating plate, a driving cog wheel mounted at the bottom of the U shaped frame, said cog meshing with the toothed periphery of the plate, brake rigging, means on the rigidly mounted member for operatively coupling the said member to the brake rigging, a brake pedal, an operating hydraulic cylinder actuated by the brake pedal, and mechanical coupling between the brake rigging and the brake pedal tending to reduce fluid pressure upon brake operation.

3. A servo brake mechanism comprising a servo motor including a pair of plates mounted on a shaft and turning therewith, and a central plate loosely mounted between said pair of plates with co-operating friction surfaces between the faces of the plates, one plate of the pair being rigidly mounted on the shaft, the other arranged to move along said shaft but turn therewith, a hydraulic cylinder adjacent the sliding plate, the ram movement of which urges the plate towards the central plate to operate the motor, a brake pedal, brake rigging, a hydraulic cylinder the ram of which is operated by brake pedal movement with fluid coupling between the two hydraulic cylinders, the driven member of the motor being connected to the brake rigging, a mechanical coupling between the brake rigging and the brake pedal, the hydraulic cylinder operated by brake pedal movement being arranged so that the movement of the brake rigging on application of the brakes tends to reduce the fluid pressure in the hydraulic system, to produce a state of balance.

4. A servo brake mechanism comprising in combination a single driven shaft, a bearing for the shaft including means retaining the shaft against axial movement, a pair of plates one of which is fixed to the shaft and the other of which is keyed to slide along as well as turn with the shaft, a third plate disposed between the pair of plates and loosely mounted on the shaft, friction faces between the said plates, a brake pedal, hydraulic means by which the operation of the brake pedal urges the two plates capable of sliding movement along the shaft towards the fixed plate to effect operative engagement of the friction faces with the plates, a peripheral portion on the intermediate plate, projecting beyond the peripheries of the pair of plates, a brake gear and means cooperating with the periphery of one of the plates for actuating the brake gear when the plates and friction faces are operatively engaged, including a mechanical coupling from the brake gear to the hydraulic means, which reduces the hydraulic pressure as the brake gear is operated.

5. A servo brake mechanism comprising in combination a single shaft, a bearing for the shaft including means retaining the shaft against axial movement, a pair of plates one of which is fixed to the shaft and the other of which is keyed to slide along as well as turn with the shaft, a third plate disposed between the pair of plates and loosely mounted on the shaft, friction faces between the said plates, a brake pedal, hydraulic means by which the operation of the brake pedal urges the two plates capable of sliding movement, along the shaft towards the fixed plate to effect operative engagement of the friction faces with the plates, a toothed peripheral portion on the intermediate plate, projecting beyond the peripheries of the pair of plates, a brake gear, a driving toothed wheel engaging the said peripheral portion of the intermediate plate and means cooperating with the periphery of the fixed plate for actuating the brake gear when the plates and friction faces are operatively engaged, including a mechanical coupling from the brake gear to the hydraulic means, which reduces the hydraulic pressure as the brake gear is operated.

6. A servo brake mechanism comprising a servo motor including a single shaft, a pair of plates one fixed to the shaft and the other floatingly mounted thereon, a spider rigidly fixed to the shaft and having pins loosely engaging in holes in the floating plate, a boss loosely mounted on the shaft between the pair of plates and having a circumferential groove, a driven central plate of annular form loosely mounted in the groove of the boss by pins passing through the sides of the groove and loosely through apertures in the central plate, a brake pedal, brake rigging, means for causing the three plates to engage by depression of the brake pedal, and means operatively connecting the fixed plate to the brake rigging.

7. A servo brake mechanism comprising a servo motor including driving and driven members, brake gear, actuating means from the driven members to the brake gear, a brake pedal, hydraulic means operable by the brake pedal to apply pressure for engaging the driving and driven members of the servo motor, and a mechanical coupling between the brake gear and the hydraulic means which reduces the hydraulic pressure as the brake gear is operated by the servo so as to produce a balanced action.

8. A servo brake mechanism comprising a servo motor including driving and driven members, brake gear, actuating means from the driven members to the brake gear, a brake pedal, hydraulic operating mechanism for the servo motor including a piston and cylinder, means for compressing the piston and cylinder by the brake applying movement of the pedal to apply hydraulic pressure which engages the said driving and driven members, including a mechanical coupling between the brake gear and the pedal which releases the piston and cylinder as the brake gear is operated by the servo motor so as to reduce the hydraulic pressure and produce a balanced action.

9. A servo brake mechanism comprising a servo motor including driving and driven members, brake gear, actuating means from the driven members to the brake gear, a pivoted brake pedal, hydraulic operating means for the servo motor including a piston and cylinder and a mechanical coupling between the brake pedal and the brake gear including the said piston and cylinder so that depression of the pedal compresses the piston and cylinder to apply hydraulic pressure causing engagement of the driving and driven members and thereby operation of the brake gear, the operation of the brake gear effecting in turn release of the piston and cylinder and a corresponding reduction in the hydraulic pressure.

10. A servo brake mechanism comprising a servo motor including driving and driven members, brake gear, means for actuating the brake gear when the said members are engaged, hydraulic means including a manually operable member for causing the application of fluid pressure to engage the driving and driven members, and means actuated by the brake applying movement of the brake gear to effect reduction of the hydraulic pressure.

11. A servo brake mechanism comprising in combination a servo motor including three coaxial and rotatable plates capable of being engaged by relative sliding movement, a brake pedal, hydraulic means operable by the brake pedal to apply pressure for engaging the plates, means for applying the brakes when the plates are engaged including a connection to the hydraulic means which reduces the hydraulic pressure as the brakes are applied so as to produce a balanced action.

12. A servo brake mechanism comprising in combination a servo motor including three coaxial and rotatable plates, capable of being engaged by relative sliding movement, brake gear, means for actuating the brake gear when the plates are engaged, a pivoted brake pedal, hydraulic operating means for the servo motor including a piston and cylinder and a mechanical coupling between the brake pedal and the brake gear including the said piston and cylinder so that depression of the pedal compresses the piston and cylinder to apply hydraulic pressure causing engagement of the said plates, and thereby operation of the brake gear, the operation of the brake gear effecting in turn release of the piston and cylinder and a corresponding reduction in the hydraulic pressure.

13. A servo brake mechanism comprising a servo motor including driving and driven members, brake gear including a pivoted arm and a coupling from the driven members for actuating the brake gear and turning the arm, a pivoted brake pedal, hydraulic operating means for the servo motor including a piston and cylinder and a mechanical coupling between the pivoted arm and the brake pedal, incorporating said piston and cylinder so that depression of the pedal compresses the piston and cylinder to apply hydraulic pressure causing engagement of the driving and driven members and thereby operation of the brake gear and turning of said arm, the movement of which in turn releases the piston and cylinder and effects a corresponding reduction in the hydraulic pressure.

14. A servo brake mechanism comprising a servo motor including coaxial and rotatable plates capable of being engaged by relative sliding movement, brake gear, means for actuating the brake gear when the plates are engaged, a brake pedal, hydraulic coupling between the brake pedal and the servo motor including a pivoted lever which under hydraulic pressure applied on depression of the brake pedal, presses the plates into engagement, and means controlled by the plate engagement movement of the lever which restores normal clearance between the plates as wear occurs.

GEOFFREY ROBERT GREENBERGH GATES,
*Formerly Geoffrey Robert Greenbergh.*